June 23, 1964
R. BREUNING
3,137,918
LATHE TOOL HOLDER WITH INTERCHANGEABLE FLAT POLYGONAL
BITS FIXED BY MEANS OF A SCREW
Filed Dec. 9, 1960
3 Sheets-Sheet 1
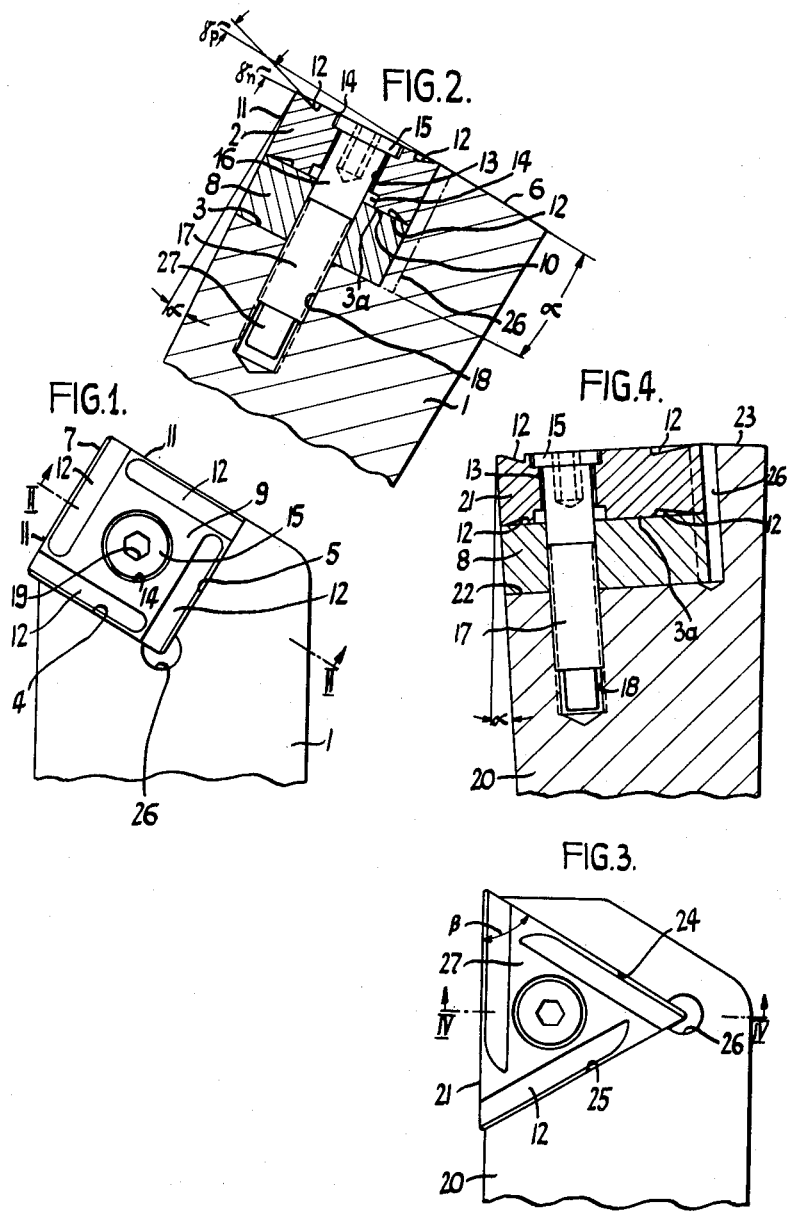
INVENTOR.
Robert Breuning
BY
Michael S. Striker
Attorney

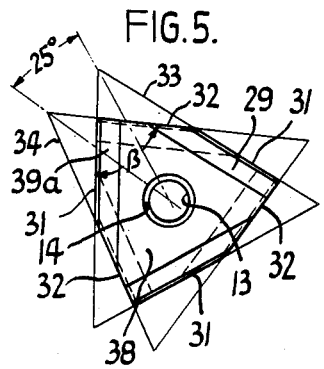

June 23, 1964 R. BREUNING 3,137,918
LATHE TOOL HOLDER WITH INTERCHANGEABLE FLAT POLYGONAL
BITS FIXED BY MEANS OF A SCREW
Filed Dec. 9, 1960 3 Sheets-Sheet 3
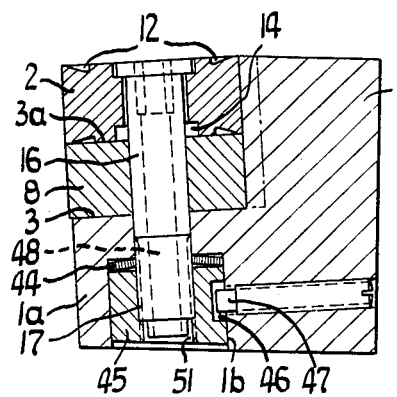
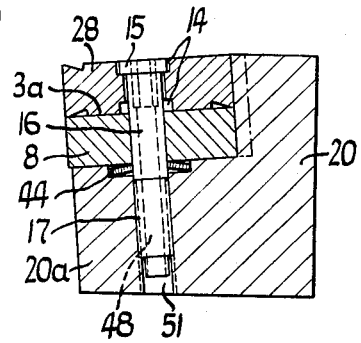
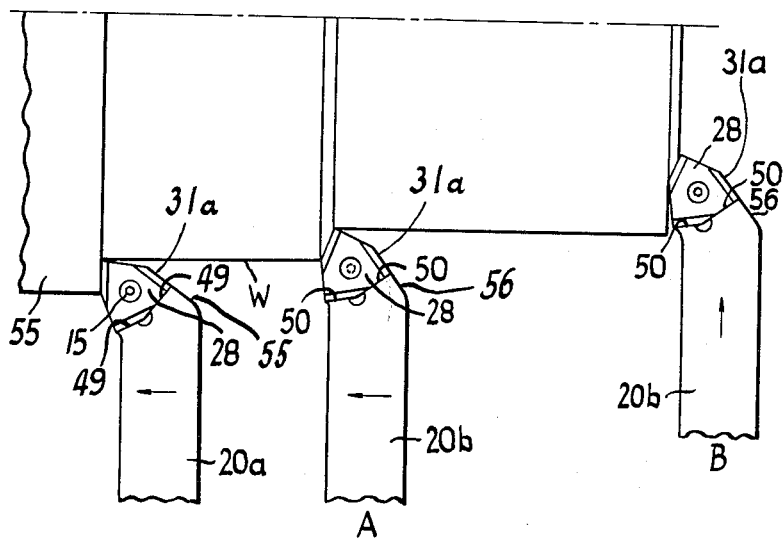
INVENTOR.
Robert Breuning
BY
Michael S. Striker
Attorney

United States Patent Office 3,137,918
Patented June 23, 1964

3,137,918
LATHE TOOL HOLDER WITH INTERCHANGE-
ABLE FLAT POLYGONAL BITS FIXED BY
MEANS OF A SCREW
Robert Breuning, 58 Hauptstrasse, Besigheim
(Neckar), Wurttemberg, Germany
Filed Dec. 9, 1960, Ser. No. 74,863
Claims priority, application Germany July 16, 1960
6 Claims. (Cl. 29—96)

The invention relates to a lathe tool holder with interchangeable flat polygonal bits fixed by means of a screw. It is the object of the invention to provide a tool holder with interchangeable bit permitting, on the one hand, 100% utilisation of the bit, and on the other hand having all the advantages of normal lathe tools (turning tools), in which the bit is permanently connected to the holder shank by brazing or the like. These known tools with fixed bits have inter alia the advantage that a positive top rake is provided, and in addition the surface of the bit is entirely free.

In known tool holders with interchangeable bits, the latter is held by a clamping element mounted on the bit, and as a rule also acting as chip breaker. Tool holders of this kind do not meet the requirements, since the clamping element obstructs the view as well as the passage of the chips, and thus impedes the machining work.

Tool holders having interchangeable quadrangular, triangular or round bits are also known, wherein the bit is seld by a screw and is inserted in a recess in the holder, the seating surface of said recess being inclined upwardly relatively to the upper side of the tool holder in the direction of the operative cutting edge. It is true that positive top rake is provided by this arrangement of the seating surface. Due to this upwardly inclined seating surface, however, the bit must have a conical shape, i.e. the side faces of the bit make an acute angle with its upper side and an obtuse angle with its lower side. The result of this is that only the edges of the upper side of the bit can be used as cutting edges, so that with this construction the expensive bits of tungsten carbide, ceramic material or the like are not fully used.

The desired object is attained by means of a lathe tool holder according to the invention, in which the holder is provided with a recess for the flat bit, the seating surface of said recess being inclined downwardly relatively to the upper side of the tool holder in the direction of the operative cutting edge, and a bit is provided which has side faces arranged at right angles to the upper and lower sides, chip-guiding steps on all the cutting edges on the upper and lower sides, and a central bore countersunk on both sides for the head of the fixing screw.

In this new lathe tool holder, the negative position of the seating surface, which primarily would give an unfavourable negative rake, makes it possible to use bits having side faces at right angles to the upper and lower sides, so that the edges of both upper and lower sides can be used as cutting edges. This new tool holder permits maximum utilisation of the bits. It is also important that despite the negative position of the upper side of the bit, a positive rake is obtained, due to the provision of the chip-guiding steps. Furthermore, due to the countersunk arrangement of the fixing screw, the surface of the bit is completely free, so that the new tool holder has all the advantages of known turning tools, while permitting 100% utilisation of the interchangeable bit. In what follows, the invention will be explained with reference to the constructional examples illustrated in the accompanying drawings, wherein:

FIG. 1 shows a plan of a lathe tool holder with interchangeable quadrangular, square flat bit, FIG. 2, a cross section on the line II—II in FIG. 1;

FIG. 3, a plan of a lathe tool holder with triangular bit as a side-working tool;

FIG. 4, a cross section on the line IV—IV in FIG. 3;

FIG. 5, a plan of a hexagonal bit as side-working tool;

FIG. 6, a view of this bit from below;

FIG. 7, a plan of a side-working tool with bit according to FIG. 5;

FIG. 8, a cross section on the line VIII—VIII in FIG. 7;

FIG. 9, a side view of the tool holder according to FIG. 7;

FIG. 10, a cross section of another constructional form of tool holder, the section being taken on a line corresponding to II—II in FIG. 1;

FIG. 11, a cross section through yet another constructional form of tool holder, the section being taken on a line corresponding substantially to the line VIII—VIII in the constructional form shown in FIG. 7;

FIG. 12, a plan of a lathe tool holder with hexagonal bit in recessing, rough turning and facing;

FIG. 13, a plan of a copying tool holder.

Referring to FIGS. 1 to 4, 1 is a tool holder and 2 is a flat square bit of tungsten carbide, ceramic material or the like. The tool holder has a recess with seating surface 3 and two lateral supporting surfaces 4 and 5, which are at right angles to the seating surface 3. As will be seen from the drawing, the seating surface 3 is inclined downwardly in the direction of the operative cutting edge 7 relatively to the upper side 6 of the tool holder, which is parallel to the lower side. In FIG. 2, this angle of inclination is denoted by $\alpha$. Between bit 2 and seating surface 3, there is provided advantageously an intermediate plate 8 of a material which is harder than the tool holder 1. In this case, the bit rests on a seating surface 3a on the intermediate plate 8. Due to the interposition of the intermediate plate, which for example is made of hardened high-speed steel, this intermediate plate absorbs so much heat that the tool holder is not deformed by the action of heat and cutting pressure.

As will be seen from the drawing, the bit 2 has side faces 11 at right angles to the upper side 9 and lower side 10, and furthermore chip-guiding steps 12 are provided on the upper side 9 and lower side 10 of all the cutting edges. The bit 2 shown by way of example accordingly has altogether eight cutting edges.

As shown in the drawing, the flat bit and the intermediate plate 8 are completely embedded in the tool holder, that is to say, the side faces 11 are flush with the side faces of the tool holder, a clearance angle $\alpha$ being provided, as shown in FIG. 2. In view of the inclined position of the seating surface 3, a negative rake $\gamma n$ is primarily obtained. Due to the provision of the chip-guiding steps 12, however, there is actually a positive top rake $\gamma p$ at the operative cutting edge 7.

A fixing screw, advantageously in the form of a cylindrical head screw, is used for fixing the bit 2. For this purpose, a central bore 13 with shallow cylindrical countersunk recesses is provided in the bit. As will be seen, the flat cylindrical head 15 of the screw fits into this countersunk recess 14, so that the head is countersunk in the bit, and therefore this fixing element does not project and a completely free bit surface is obtained.

FIG. 2 also shows that there is so much clearance between screw shank 16 and bore 13, and between cylinder head 15 and countersinking recess 14 that under the effect of the horizontal component of the cutting pressure, the bit is supported only by the lateral faces 4 and 5 of the holder. The fixing screw thus takes up tensile forces only but no bending forces, so that a screw of comparatively small diameter may be used. The advantage of this is that the bore 13 also has a comparatively small diameter, that is to say, the flat bit is scarcely weakened by the bore. Due to this small bore, it is also possible to use a comparatively small bit.

Furthermore, according to the invention, the threaded shaft 17 of the screw is made so long that when the bit is rotated for changing the cutting edges, the screw need not be screwed completely out of the screw-threaded bore 18 of the holder. For changing the cutting edges, therefore, the cylindrical head screw, which has a hexagonal recess 19 for the spanner, is unscrewed somewhat, the bit 2 is then lifted, rotated through 90° and then re-inserted into the recess defined by the lateral faces 4 and 5, whereupon the screw 17 is re-tightened.

FIGS. 3 and 4 show the arrangement according to the invention in the case of a tool holder 20 with triangular bit 21, used as a side-working tool. Here again, the seating surface 22 is inclined downwardly relatively to the upper side 23 of the tool holder, and chip-guiding grooves 12 are also provided on the upper and lower sides of the bit at all the cutting edges. The recess provided in the tool holder for the bit 21 has lateral supporting faces 24, 25 for supporting the bit, these faces being at right angles to the seating surface 22. To prevent damage to the comparatively delicate cutting edges at the corners of the bit, the corners formed by the side faces 24, 25 or 4 and 5 are drilled out as shown at 26. For rapid and convenient insertion and screwing of the fixing screws 17, they are provided at the end with a guide stud 27.

As shown by FIGS. 3 and 4, in the case of a triangular bit, the latter is weakened to a relatively considerable degree by the bore 13, so that to obtain sufficient resistance to fracture, the triangular bit must be of comparatively large dimensions or edge lengths. Since in addition, this triangular bit has a comparatively sharp angle β, these points are jeopardised in view of the high feed pressures, and are easily broken off.

To obviate these disadvantages in side-working tools, a hexagonal bit 28 is provided according to FIGS. 5 to 9, this bit having chip-guiding steps 29 and 30 on the upper and lower sides of every other cutting edge. In the particularly advantageous construction shown, the edges 31 and 32 of the bit are formed by the side sections of two congruent equilateral triangles 33 and 34, which have been turned through about 25° on their common centre of gravity.

By this construction according to FIGS. 5 and 7, a point angle β of 85° is obtained, that is to say, a much larger angle than in the case of the bit of triangular shape according to FIG. 3. In view of this larger point angle β, the risk of fracture of the operative point 36 of the bit is considerably reduced. The new hexagonal form of bit has also the advantage of being weakened much less by the central bore 13 than is a triangular bit. In addition, the external dimensions of this hexagonal bit may be made much smaller than in the case of a triangular bit, resulting in a considerable saving in material. Comparison of FIG. 3, FIG. 5 and FIG. 7 also shows that in the case of the triangular bit of FIG. 3, the chip-guiding steps 12 leave only a relatively small flat surface 37, which is inadequate as seating surface, especially at the edges. In contrast thereto, in the hexagonal shape of bit according to FIGS. 5 to 9, a much larger seating surface 38 and 39 is obtained.

Seating of the bit can also be improved advantageously by offset arrangement of the cutting edges and chip-guiding steps on the upper side of the bit relatively to the lower side. Accordingly, in the case of the hexagonal bit, on the upper side 38, the cutting edges 31 and chip-guiding steps 29 are provided on the side sections of one triangle 33, and on the lower side, the cutting edges 32 and chip-guiding steps 30 are provided on the side sections of the other triangle 34.

Therefore, under the operative cutting edge 34 in FIG. 7, there is not another cutting edge and chip-guiding step on the lower side of the bit, but on the contrary the part 39a of the lower surface 39. Thus, very good seating and support is provided for this hexagonal bit.

FIGS. 7 and 8 furthermore show that the recess provided in the tool holder for the hexagonal bit 28 has, in addition to the inclined seating surface 40, three lateral surfaces 41, 42 and 43 so arranged that the bit is supported only on the two externally situated lateral surfaces 41 and 43. At the same time, the corners formed by the lateral surfaces 41 to 43 are advantageously drilled out, as indicated at 26.

As shown further by the drawings, in the case of the hexagonal bit 28, the chip-guiding steps 29 and 30 are continuous, unlike those of the bits of FIGS. 1 and 3. In this way, not only is the complete side edge length utilised as cutting edge, but in addition, grinding of the chip-guiding steps is facilitated.

Another substantial advantage of the hexagonal bit according to FIGS. 5 to 9 is that when the cutting edges become worn, all the continuous chip-guiding steps can be re-ground without diminishing the seating surface of the bit on the tool holder. Despite repeated regrinding, therefore, the cutting action remains completely unimpaired.

FIG. 12 furthermore, shows that the hereinbefore described hexagonal bit 28 can be used for different machining operations on a work-piece 55. Thus, the hexagonal bit 28 fixed to a tool holder 20a (side-working tool) can be used for recessing.

FIG. 12 also shows at A that a tool holder 20b with the hexagonal bit 28 can be used for rough turning and that as shown at B, the same tool holder 20b is also suitable for facing. As follows from FIG. 12, A and B, the recess for the bit 28 and the supporting surfaces 50 on the tool holder are so arranged that the tool holder can be used for both roughing and facing.

FIG. 12 shows that the front end of tool holders 20a and 20b is bent towards the cutting edge and at the same time is tapered so that its outline corresponds approximately to the outline of the bit 28, or the back 55 or 56 of the tool holder does not project beyond the corresponding edge 31a of the bit. This construction has inter alia the advantage that work-pieces of small diameter can be machined, since the front end of the tool holder, due to the provision of the inclined back 56, is not affected by the lathe centre which holds the work-piece.

FIG. 12 shows furthermore that only two supporting surfaces 49 and 50 are provided on the tool holder, these surfaces corresponding in size and arrangement to two adjacent side faces 31, 32 of the bit.

A problem which arises in the case of tool holders of the kind described resides in the different thermal expansion of the various parts. The tool holder, principally its bit, become hot in operation. Due to the different coefficients of expansion, the fixing screw as a rule expands more than the bit 2 or 28, the intermediate plate 8 and the part of the tool holder denoted by 1a and 20a, respectively, together. The pressure between the bit 2 or 28 and the intermediate plate on the seating surface 3a, is thereby decreased or eliminated, so that the bit becomes loose. To prevent this, in the tool holders shown in FIGS. 10 and 11, a resilient element 44 is provided, which is compressed when the fixing screw is tightened and is so arranged as to maintain the pressure between the bit and the intermediate plate on the seating surface 3a.

With the exception of the device for compensating thermal expansion, the tool holder shown in FIG. 10 corresponds substantially to the tool holder shown in FIGS. 1 to 4. The same parts have therefore been given the same reference numerals. Except for the provision of a load relieving element for compensating the differential thermal expansion, the tool holder shown in FIG. 11 corresponds to the tool holder shown in FIGS. 7 to 9, the same parts having been provided with the same reference numerals.

In the advantageous constructional example shown in FIG. 10 a nut 45 is connected to the tool holder 1 in an axially movable but non-rotatable manner. The fixing screw is screwed into this nut and can move axially in the tool holder 1 and also relatively to the bit 2 and intermediate plate 8. The resilient element 44 is inserted between the nut 45 and tool holder 1 so as to exert a tensile force on the fixing screws.

Advantageously, the tool holder 1 has on the lower side a recess 1b into which the nut 45 is inserted. In the axial direction, the nut has a groove 46 in which engages a pin 47. This pin, which in the constructional example shown is made as a screw-threaded pin, by its engagement in the groove prevents rotation of the nut 45, but allows it to move axially in the recess 1b. The resilient element 44 tends to force the nut 45 downwardly out of the recess 1b, thereby also pulling downwardly the fixing screw screwed to the nut. This tensile force is transmitted at the head of the fixing screw to the bit 2 and presses the latter firmly against the seating surface 3a. In this process, the resilient element 44 expands somewhat, but only to such a slight extent that the force of application is still sufficient to hold the bit firmly on the seating surface.

In the constructional example according to FIGURE 11, the resilient element 44 is inserted between the tool holder 20 and the intermediate plate 8. The fixing screw is screwed fast to the tool holder 20. If it expands more strongly than the tool holder portion 20a, intermediate plate 8 and bit 28 together, the resilient element 44 presses the intermediate plate 8 together with the bit 28 upwardly against the head 15 of the fixing screw. In this way, pressure is maintained between bit 28 and intermediate plate 8 on the seating surface 3a. It is true that a gap is formed between the tool holder 20 and the lower side of the intermediate plate 8; this gap is so small, however, that it has no influence whatsoever on the stability of the tool.

Preferably, a simple plate spring is used as resilient element 44.

As shown, the fixing screw is advantageously formed as a screw with a hexagonally recessed head. There is however a danger that the hexagonal recess will be filled with chippings so that after a time the hexagonal spanner cannot be inserted. To eliminate this drawback, advantageously the screw is bored through axially and the bore receiving the screw in the tool holder is made continuous. Chippings which become lodged in the hexagonal recess of the fixing screw can then be pushed out downwardly through the axial bore, denoted in the drawing by 48. Blocking of the hexagonal recess of the screw can thus no longer occur or can easily be removed.

FIGURE 13 shows another constructional example according to the invention. At 51 is shown a copying tool holder, on which according to the invention a rhomboidal bit 52 is fixed by means of the above-mentioned screw 15. This bit 52 has substantially the same construction and arrangement in the tool holder as the bit 2 shown in FIGURES 1 to 4. On the upper side of the bit 52, however, only two continuous chip-guiding steps 53 are provided, and on the lower side also two chip-guiding steps 54, offset relatively to the former and indicated by dotted lines. This bit, therefore, has four cutting edges in all.

What I claim is:

1. A cutting tool comprising, in combination, an exchangeable tool bit being formed by a hexagonal plate having an upper face and a lower face substantially parallel to each other, and side faces extending between said upper and lower faces substantially perpendicular thereto and intersecting said upper and lower faces along edges of equal length, every second one of said edges of said lower and upper faces being formed as a cutting edge with a chip guide groove extending substantially parallel thereto and between the edges on the respective face adjacent said cutting face, said cutting edges including with one of said edges adjacent thereto an angle of less than 90°, said tool bit being formed with a bore extending between said upper and lower faces substantially perpendicular thereto and being counterbored at each of said faces; a tool holder having a front end and being formed therein with a cutout in which said tool bit is located, said cutout being defined by a bottom face and pair of side faces substantially perpendicular to said bottom face and inclined to each other at an angle equal to that between side faces of said tool bit and said tool bit abutting with side faces thereof against said side faces of said cutout, said tool holder being formed with a threaded bore aligned with said bore in said tool bit and extending from said bottom face substantially perpendicular thereto into said tool holder; and a screw for fastening said tool bit to said tool holder and extending through said bore in said bit into said threaded bore with the head of said screw located in the counterbore formed at said upper face, said bore and counterbore having a diameter greater than that of screw shank and head, respectively, so that cutting pressure on said bit will be taken up by said side faces of said cutout without subjecting said screw to bending stresses.

2. A cutting tool as defined in claim 1 and including an intermediate plate sandwiched between said lower face of said bit and said bottom face of said cutout and being formed with an aperture therethrough aligned with said bore and through which said screw extends with clearance, said intermediate plate being formed from material harder than that of said tool holder.

3. An arrangement as defined in claim 1 in which said screw is a cap screw of the socket type and being formed with a bore extending from the socket in the head longitudinally through said screw and in which said threaded bore in the screw holder extends completely through the latter so that chips entering said socket can be discharged through said bore in said screw and through said bore in said tool holder.

4. An arrangement as defined in claim 1 in which the front end of said tool holder is offset toward the cutting edge of said bit distant from said side faces of said tool holder and in which said front end of said tool holder tapers in such a way that the contour of said front end corresponds substantially to the contour of said lower face of said tool bit.

5. An arrangement as defined in claim 1 in which said bottom face and said side faces of said cutout in said tool holder are arranged in such a manner that the tool bit may be used for rough planing as well as facing.

6. A cutting tool defined in claim 1 in which said cutting edges on said upper face of said tool bit are offset with respect to the cutting edges on said lower face thereof.

References Cited in the file of this patent

UNITED STATES PATENTS

| | | |
|---|---|---|
| 2,630,725 | Black | Mar. 10, 1953 |
| 2,641,049 | Kennicott | June 9, 1953 |
| 2,645,003 | Thompson | July 14, 1953 |
| 2,713,714 | Krause | July 26, 1955 |
| 2,838,827 | Wright | June 17, 1958 |
| 2,870,523 | Richard | Jan. 27, 1959 |
| 2,897,580 | Huber | Aug. 4, 1959 |
| 2,930,111 | St. Clair | Mar. 29, 1960 |
| 2,964,833 | Novkov | Dec. 20, 1960 |

FOREIGN PATENTS

| | | |
|---|---|---|
| 35,364 | Switzerland | Dec. 19, 1905 |
| 315,005 | Germany | Oct. 20, 1919 |
| 320,809 | Great Britain | Oct. 24, 1929 |
| 1,099,534 | France | Mar. 23, 1955 |
| 1,210,037 | France | Sept. 28, 1959 |